United States Patent
Warren et al.

(10) Patent No.: US 8,919,666 B2
(45) Date of Patent: *Dec. 30, 2014

(54) METHOD AND SYSTEM FOR PREHEATING EPOXY COATINGS FOR SPRAY APPLICATION

(75) Inventors: Danny Warren, Carver, MA (US); David Allen Smith, Middleborough, MA (US)

(73) Assignee: Warren Environmental, Inc., Carver, MA (US)

( * ) Notice: Subject to any disclaimer, the term of this patent is extended or adjusted under 35 U.S.C. 154(b) by 531 days.

This patent is subject to a terminal disclaimer.

(21) Appl. No.: 13/048,014

(22) Filed: Mar. 15, 2011

(65) Prior Publication Data

US 2011/0192425 A1 Aug. 11, 2011

Related U.S. Application Data

(63) Continuation-in-part of application No. 11/275,952, filed on Feb. 7, 2006, now Pat. No. 7,694,894, which is a continuation-in-part of application No. 11/934,808, filed on Nov. 5, 2007, now Pat. No. 7,926,739.

(60) Provisional application No. 60/672,694, filed on Apr. 19, 2005.

(51) Int. Cl.
*B05B 1/24* (2006.01)
*A62C 13/66* (2006.01)
*B05B 7/16* (2006.01)
*B05D 1/02* (2006.01)
*B29B 7/82* (2006.01)
*B05D 1/34* (2006.01)
*B29K 63/00* (2006.01)
*F28D 1/06* (2006.01)
*F28D 7/02* (2006.01)

(52) U.S. Cl.
CPC ............... *B05B 7/166* (2013.01); *B05B 7/1673* (2013.01); *B05D 1/02* (2013.01); *B29B 7/826* (2013.01); *B05D 1/34* (2013.01); *B05D 2504/00* (2013.01); *B29K 2063/00* (2013.01); *F28D 1/06* (2013.01); *F28D 7/024* (2013.01)
USPC .......... 239/137; 239/128; 239/132.1; 239/310; 239/398; 239/135; 165/132; 118/302

(58) Field of Classification Search
USPC .............. 239/135, 128, 132.1, 310, 226, 137, 239/139; 165/132, 140; 427/422, 426, 427/427.4, 421.1, 207.1; 118/300, 302
See application file for complete search history.

(56) References Cited

U.S. PATENT DOCUMENTS

| | | | |
|---|---|---|---|
| 4,090,668 A | 5/1978 | Kochenour | |
| 4,792,661 A | 12/1988 | Schmidtchen et al. | |

(Continued)

FOREIGN PATENT DOCUMENTS

| | | |
|---|---|---|
| DE | 299919016 | 12/1999 |
| DE | 10329470 A1 | 1/2005 |

(Continued)

OTHER PUBLICATIONS

Safety harness shock absorbing lanyards and fall arrest working at height safety harness, "www.safetysupplies.co.uk/trolleyed/21index.htm".

(Continued)

*Primary Examiner* — Justin Jonaitis
(74) *Attorney, Agent, or Firm* — Barlow, Josephs & Holmes, Ltd.

(57) ABSTRACT

A method and system for the spray application of epoxy materials is provided. The system includes a dual walled tank structure as a reservoir for containing and preheating the epoxy materials in preparation for mixing and spray application. Each component of the epoxy material is preheated before the components are mixed. After preheating, the components are then mixed together and spray applied. The method and system of the present invention provides a high quality spray applied epoxy coating while reducing equipment down time and cleaning.

8 Claims, 3 Drawing Sheets

(56) References Cited

U.S. PATENT DOCUMENTS

| | | | |
|---|---|---|---|
| 5,004,159 | A | 4/1991 | Kistner |
| RE34,561 | E | 3/1994 | Zaber |
| 5,598,900 | A | 2/1997 | O'Rourke |
| 5,612,394 | A | 3/1997 | Pfeil et al. |
| 5,645,217 | A | 7/1997 | Warren |
| 6,049,931 | A * | 4/2000 | McClain et al. ............ 8/159 |
| 6,085,802 | A | 7/2000 | Silberberg |
| 6,319,559 | B1 * | 11/2001 | Makino .................. 427/422 |
| 6,390,234 | B1 | 5/2002 | Boyer |
| 6,419,263 | B1 | 7/2002 | Busgen et al. |
| 6,457,774 | B2 | 10/2002 | Baloga |
| 6,471,298 | B2 | 10/2002 | Carine et al. |
| 6,491,874 | B1 | 12/2002 | Smith et al. |
| 6,521,298 | B1 | 2/2003 | Banks |
| 6,533,066 | B1 | 3/2003 | O'Dell |
| 6,564,754 | B1 | 5/2003 | Cohen |
| 6,615,438 | B1 | 9/2003 | Franco et al. |
| 7,163,081 | B2 | 1/2007 | Muhich |
| 7,264,178 | B1 | 9/2007 | Hugg |
| 7,350,862 | B2 | 4/2008 | Fransen et al. |
| 7,926,739 | B2 | 4/2011 | Warren et al. |
| 2004/0176563 | A1 | 9/2004 | Shinohara et al. |
| 2005/0189169 | A1 | 9/2005 | Tanaka et al. |
| 2006/0027277 | A1 | 2/2006 | Jennings et al. |
| 2006/0048723 | A1 | 3/2006 | Rohif et al. |
| 2006/0071535 | A1 | 4/2006 | Kim et al. |
| 2006/0233960 | A1 | 10/2006 | Warren et al. |
| 2006/0266581 | A1 | 11/2006 | Tanaka et al. |
| 2008/0057209 | A1 | 3/2008 | Warren et al. |
| 2009/0061098 | A1 | 3/2009 | Warren et al. |

FOREIGN PATENT DOCUMENTS

| | | |
|---|---|---|
| FR | 2760648 A1 | 9/1998 |
| JP | 10033703 | 2/1998 |
| JP | 11104257 | 4/1999 |
| JP | 2005261409 | 9/2005 |

OTHER PUBLICATIONS

Textile World, "Textiles in Automotive Engineering,"www.testileworld.com/Products.htm?ID=337.

MSA Fall Protection 15, "ArcSafe Fall Protection Products", "www.westernsafety.com/msaroseproducts/msafallprotec15.html".

Polypropylene glycol diglycidyl ether MSDS, No Date Available.

Bisphenol A MSDS, No Date Available.

Methanol MSDS, No Date Available.

* cited by examiner

METHOD AND SYSTEM FOR PREHEATING EPOXY COATINGS FOR SPRAY APPLICATION

CROSS-REFERENCE TO RELATED APPLICATIONS

This application is a continuation in part of U.S. patent application Ser. No. 11/934,808, filed Nov. 5, 2007, which is a continuation in part of U.S. patent application Ser. No. 11/275,952, filed Feb. 7, 2006 which is related to and claims priority from earlier filed U.S. Provisional Patent Application No. 60/672,694, filed Apr. 19, 2005.

BACKGROUND OF THE INVENTION

The present invention relates generally to a system for the spray application of epoxy materials. More specifically, the present invention is directed to a method and system for preheating the various components of epoxy materials prior to their being mixed in order to reduce their viscosity thereby facilitating spray application thereof.

Generally, epoxy coatings are well known in the art and due to their exceptional durability and structural properties epoxy based protective coatings have gained commercial acceptance as protective and decorative coatings for use on a wide variety of materials. For example, epoxy based protective coatings represent one of the most widely used methods of corrosion control. They are used to provide long term protection of steel, concrete, aluminum and other structures under a broad range of corrosive conditions, extending from atmospheric exposure to full immersion in highly corrosive environments. Further, epoxy coatings are readily available and are easily applied by a variety of methods including spraying, rolling and brushing. They adhere well to steel, concrete and other substrates, have low moisture vapor transmission rates and act as barriers to water, chloride and sulfate ion ingress, provide excellent corrosion protection under a variety of atmospheric exposure conditions and have good resistance to many chemicals and solvents. As a result, numerous industries including maintenance, marine, construction, architectural, aircraft and product finishing have adopted broad usage of epoxy coating materials.

The most common material utilized in the epoxy coating industry today is a multi-part epoxy material. In general the epoxy includes a first base resin matrix and at least a second catalyst or hardener, although other components such as a pigment agent or an aggregate component may also be added. While the two parts remain separate, they remain in liquid form. After the two parts are mixed together, they begin a curing process that is typically triggered by exposure to heat, humidity or a ultra-violet light source, whereby the mixed material quickly begins to solidify. The resin base and the catalyst are typically highly viscous in consistency and when mixed, generally having a paste like consistency.

The difficulty found in the prior art is that while epoxy has highly desirable characteristics as a finished coating, the preferred method of application is spray application. When attempting to spray apply an epoxy, two drawbacks are encountered. First, the material cannot be mixed in large batches prior to application because of the short pot life of the material. Accordingly, it must be mixed on an as needed basis immediately prior to spray application. Second, the naturally viscous consistency of the mixed epoxy material is not well suited for spray application. To thin the epoxy to the consistency required for typical prior art spray application, the epoxy must be loaded with a large percent by volume of solvent. Such a solvent typically contains high level of volatile organic compounds (VOC) whose primary function is to lower viscosity thereby providing a consistency suitable for spray application with conventional air, airless and electrostatic spray equipment. The addition of the solvent to the epoxy coating material in turn greatly increases the VOC content of the epoxy coating material and reduces the build thickness of the finished and cured coating.

In view of the above, the problem with spray application of epoxy coating materials becomes two fold. First, there is a growing emphasis on compliance with government environmental and health hazard regulations, which in turn has prompted coating material manufacturers and end users to evaluate new coating technologies. The Clean Air Act sets limits on both the type and amount of VOC content found in coating materials and has resulted in research directed to higher solids, solventless and waterborne protective coating systems. As a result of such research, the newer epoxy materials are either highly viscous resulting in a poor quality finish when spray applied or too thin to produce the type of high build coating that is normally expected from spray applied epoxy coatings.

While many processes and techniques have been proposed in the prior for the spray application of epoxy coating materials to substrates, prior art spray processes are directed to the reduction of material viscosity through the use of solvents. In most cases, such spray operations operate with materials having a low viscosity on the order of 100 poise and utilize a relatively low application pressure on the order of no more than about 100 psi.

Therefore, there is a need for a system and method of spray application of high molecular weight, highly viscous polymeric thermally cured materials at elevated temperature. There is a further need for a system and method of applying epoxy coating materials that eliminates or reduces the need for solvent loading while also providing a mixed epoxy product that has a consistency that is suitable for spray application. There is still a further need for a system for spray applying an epoxy material that is capable of continuous duty wherein a low viscosity epoxy can be spray applied without a high level of equipment down time or recycling time. Simply stated, the art is devoid of any proven technique for spraying high molecular weight epoxy coating materials of this character.

BRIEF SUMMARY OF THE INVENTION

In this regard, the present invention provides for a method and system capable of reducing the viscosity of epoxy materials in preparation of spray application without the need of thinning through the addition of VOC solvents. In the method and system of the present invention the component parts of the epoxy material are preheated before they are mixed, thereby achieving a large reduction in the material viscosity without requiring thinning of the material or the addition of solvents.

The present invention provides for a dual walled tank structure as a reservoir for containing and preheating the epoxy materials in preparation for mixing and spray application. The inner wall of the tank forms a storage reservoir in which the base resin is stored. The cavity between the inner wall and the outer wall in the dual wall construction provides a water jacket that surrounds the interior tank. Heating elements are provided within the water jacket, which serve to heat the water within the water jacket, which in turn heats the interior tank and the resin stored therein. Preferably, the water jacket heats the resin to a discharge temperature of approximately between 150° F. and 160° F. Also within the scope of the present invention, the water jacket may include in addition to plain water a simple soap or detergent additive that is employed to flush the resin and catalyst lines after the spray application is completed. In the prior art, the lines were traditionally flushed using solvents creating a potentially hazardous condition when applying materials in closed environments. The present invention instead employs a solvent free soap and water mixture thereby making the entire process solvent free.

It is important to note that in the preferred embodiment of the present invention, the heating of the resin takes place in two steps. In the first heating step, the resin in the tank is initially heated to a temperature that allows the resin to flow, but is well below the evaporation temperature of the various components within the resin. This prevents various chemical components within the base resin from flashing off, thereby changing the chemical composition and characteristics of the resin. In a second heating step, as the resin is being pumped out of the storage tank it enters a series of heating coils that serve to contain the resin in a closed environment while heating the resin to the desired application temperature. In this manner, even if evaporation does occur, it is fully contained and all of the resin components are transferred intact to the mixing nozzle. Similarly, if the catalyst were heated to the target temperature range using the same method in an open container, some of the components, such as ammonia, that are in the catalyst would evaporate creating problems in the finished product. Since the catalyst cannot be heated in an open chamber another set of coils is provided that resides within the water jacket. The catalyst is passed through these coils before mixing, as will be discussed in detail below, to also preheat the catalyst to the desired temperature range.

Yet another set of coils may be provided to facilitate the refilling of the resin tank while the machine is in operation. This coil extends from the exterior of the tank into the resin tank and allows the resin to be preheated before it is deposited into the resin storage tank. This allows the resin tank to be periodically refilled without having to stop the application of the material while waiting for the newly added material in the resin storage tank to preheat.

The resin is drawn from the resin storage tank by a resin pump after being heated. The catalyst is push pumped by a second pump through the catalyst heating coil. The resin and catalyst flows are then joined in a third mixing pump that mixes the two parts together and supplies the pressurized epoxy to a spray applicator for application onto the desired surface. The method and system of the present invention therefore provides a two-part epoxy mixture that is preheated and has a viscosity that is sufficiently low for spray application without the need for the addition of solvent. The resulting coating has an improved build and a higher structural value as compared to epoxies that were applied using the prior art systems and methods.

It is therefore an object of the present invention to provide a method and system for the spray application of epoxy coating material. It is a further object of the present invention to provide a method and system for the spray application of epoxy coating material while eliminating the need for thinning the material with VOC solvents. It is yet a further object of the present invention to provide a method and system for the spray application of epoxy coating material by preheating the component parts of the material in a closed environment before combining and mixing the component parts thereby achieving a reduction in the viscosity of the epoxy material without the need for the addition of VOC solvents. It is still a further object of the present invention to provide a method and system for spray application of epoxy material that is capable of preheating the material in a manner that substantially reduces the material viscosity while also being capable of near continuous operational duty.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
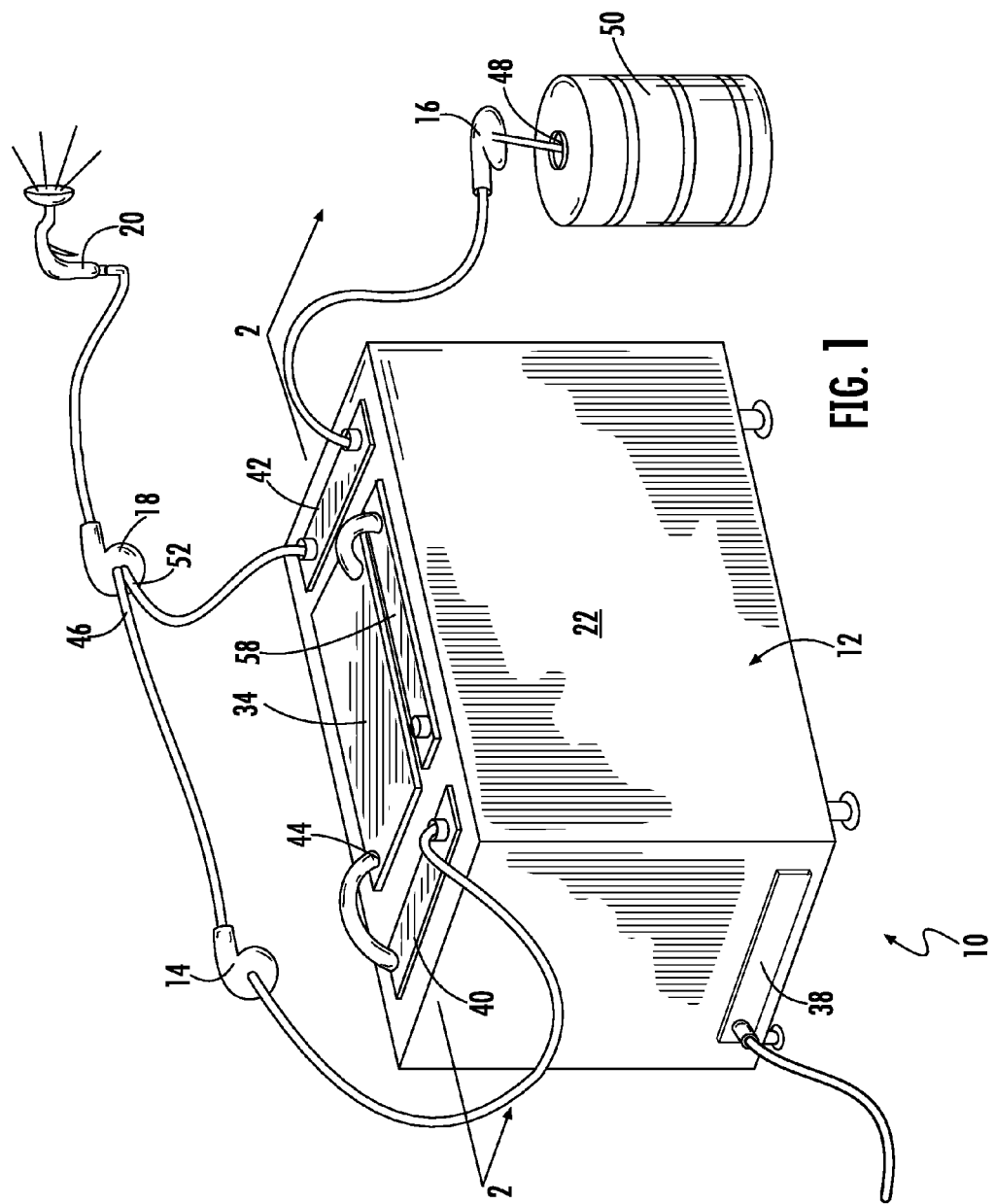
FIG. 1 is a perspective view of a preferred embodiment system for the spray application of epoxy material in accordance with the disclosure of the present invention.

Now referring to the drawings, a preferred embodiment of the system for spray application of epoxy coating materials is shown and generally illustrated at 10 in the figures. It is important to understand that while this preferred embodiment is shown for the purpose of illustration, the system and method of the present invention may be accomplished by using many different structural variations that are still intended to be covered within the scope of the present invention. Further, for purposes of the present application, the term "spray application" refers to breakup of the material into small particles or droplets that are broadcast onto a substrate in a pattern, such as a fan, sheet or cone pattern, that has a width at the point of deposition on the substrate that is many times the diameter of the spray nozzle opening. Spray application is therefore defined in a manner that is to be distinguished from "flowing" or "extruding" where the material at the point of deposition has a dimension that is about the same a the dimension of the opening. Accordingly, as discussed above, the present invention is directed to a method and system for spray application of high molecular weight polymeric thermal-cure epoxy materials, such as structural epoxy, that handles the material at application temperature and pressure without requiring solvents or the like to reduce viscosity.

Figure 2:
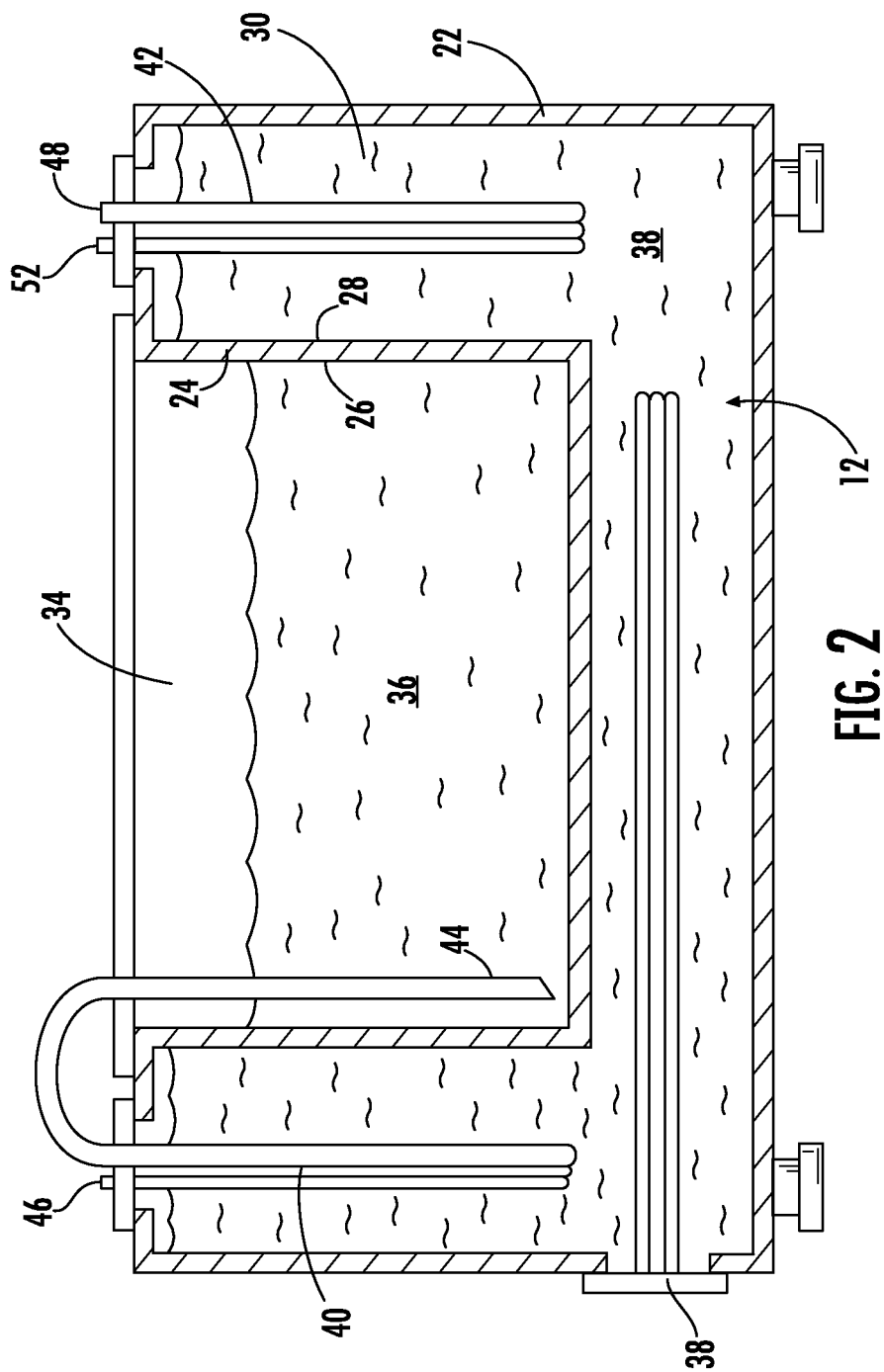
FIG. 2 is a cross-sectional vies of the system taken along line 2-2 in FIG. 1.

Turning now to FIGS. 1 and 2, it can be seen that the system 10 of the present invention includes generally a heating tank 12, means for establishing a flow of epoxy resin 14 through the heating tank 12, means for establishing a flow of catalyst 16 thought the heating tank 12, means for mixing the flow of resin and catalyst 18 to form a multi-part epoxy mixture and a discharge nozzle 20 for the spray application of the epoxy mixture onto a substrate surface.

The heating tank 12 is the principal element of the system 10 of the present invention. The heating tank 12 is constructed using a double wall construction. The heating tank 12 includes an outer structural wall 22 that encloses the entire assembly and serves to house and contain the required heating elements of the system 10 of the present invention. The outer tank wall 22 may be metallic or formed from a structural polymer such as a reinforced fiberglass or the like. Further, the exterior surface of the outer wall 22 may be insulated to increase the performance and energy efficiency of the overall system 10. Disposed on the interior of the heating tank 12 is an inner wall 24 that is generally placed in spaced relation to the outer wall 22. The inner wall 24 has inner surface 26 and an outer surface 28, wherein the said outer wall 22 and said outer surface 28 of said inner wall 24 cooperate to form a heating jacket 30 therebetween. In particular, the inner wall 24 and outer wall 24 cooperate to form a chamber that is suitable to receive and retain a heat transfer medium 32 thereby creating a heating jacket 30. In the preferred embodiment, the heat transfer medium 32 is water, although any fluid medium that is known in the art to be suitable for the effective and efficient transfer of heat between objects may be used and still fall within the scope of the present invention.

The inner surface 26 of the inner wall 24 is formed in a manner that creates an interior chamber 34, which is surrounded on at least its perimeter by the heating jacket 30. The interior chamber 34 is segregated from the heating jacket 30 and is formed to receive and retain the base resin material 36 therein. As will be described in further detail below, the resin 36 within the interior resin chamber 34 is preheated as a result of heat transfer to the interior resin chamber 34 from the heat transfer medium 32 contained in the surrounding heating jacket 30.

A means for heating 38 the heat transfer medium 32 is disposed within the heating jacket 30 and is in contact with the heat transfer medium 32. The means for heating 38 the heat transfer medium 32 may include any suitable heating means known in the art. For example, the heating means 38 may be any direct heating means such as an electrical resistance heating coil or a direct-fired fuel burner such as a natural gas, propane or oil fired burner. Similarly the heating means 38 may be any known means of indirect heating means. Generally for the purpose of the present invention, means for heating 38 the heat transfer medium 32 encompasses any known device for imparting heat to the heat transfer medium 32. Further, within the scope of the present invention, the heat transfer medium 32 may include in addition to plain water a simple soap or detergent additive that is employed to flush the resin and catalyst conduits 40, 42 lines after the spray application is completed. In the prior art, the lines were traditionally flushed using solvents creating a potentially hazardous condition when applying materials in closed environments. The present invention instead employs a solvent free soap and water mixture thereby making the entire process solvent free. Such a concept is applicable to all phases of the industrial coatings industry where applicator safety in confined application spaces and environmental issues are a priority. Heated water from the heating jacket or an independent heated water tank is combined with a solvent free soap or biodegradable degreaser. The mixture is then circulated via pump through the lines, mixing pump and spray application to purge and clean the epoxy materials therefrom. This provides the first method and system for spray application of 100% solids epoxy while eliminating the VOC pollution and solvent flash/explosion issues typically associated with such applications. The system further serves to enhance the protection and safety of the workers using the equipment within such spaces.

As was stated above therefore, the heating jacket 30 provides a means by which the heat transfer medium 32 can facilitate a uniform and steady supply of heat to preheat the resin 36 contained in the resin chamber 34. In addition to having a heating means 38 within the heating jacket 30, the present invention provides at least a resin heat transfer conduit 40 and a catalyst heat transfer conduit 42, both of which are disposed within said heating jacket 30. The resin heat transfer conduit 40 is formed as a continuous piping conduit that has a an input end 44 in fluid communication with said resin chamber 34 and an output end 46 disposed on the exterior of the outer wall 22 of the heating tank 12. Similarly, the catalyst heat transfer conduit 42 is formed as a continuous piping conduit that has an input end 48 in fluid communication with a catalyst reservoir 50 and an output end 52 disposed on the exterior of the outer wall 22 of the heating tank 12. The piping conduit that extends between the input end and the output end of both the catalyst and resin heat transfer conduits 42, 40 extends through the heating jacket 30. Further the piping conduit of both the resin and catalyst heat transfer conduits 40, 42 may be formed in a manner that provides increased surface area in order to facilitate heat transfer from the heating jacket 30 to the interior of the heat transfer conduits 40, 42. To accomplish this, the resin and catalyst heat transfer conduits 40, 42 may each be formed as a coil having several loops of piping that all pass through the heating jacket 30. Additionally, the outer surface of piping conduit may include other surface area enhancements such as ribs or fins.

The operational portion of the system of the present invention includes means for establishing a flow of resin 14, means for establishing a flow of catalyst 16 and means for mixing 18 the flow of resin and catalyst in preparation of discharge of the epoxy coating. In each case, in the preferred embodiment the means for establishing the flow is preferably a pump. The pump may be any type pump suitable for the transfer of fluid materials. In establishing a flow of resin, a resin pump 14 is preferably connected to the output end of the resin heat transfer coil 40 thereby drawing resin 36 from the resin chamber 34 and through the resin heat transfer coil 40. The flow of catalyst is established by a catalyst pump 16 that draws the catalyst from a catalyst reservoir 50 and discharges the catalyst into the input end of the catalyst heat transfer conduit 42 thereby pushing the catalyst through the catalyst heat transfer conduit 42. Both the flow of resin 54 and the flow of catalyst 56 are then discharged into a mixing pump 18 where the catalyst and resin are mixed and discharged at an elevated pressure to a spray nozzle 20 for spray application of the mixed, multi-part epoxy. While a particular pumping arrangement is disclosed, anyone skilled in the art can appreciate that repositioning the various pumps by placing them at different locations in the flow paths of the catalyst and resin would still produce a device that would fall within the scope of the present invention.

It is important to note that in the preferred embodiment of the present invention the resin 36 and catalyst are both heated separately before they are mixed. In the prior art, when the two parts were mixed prior to heating, the applicator was faced with a tank full of activated material that has a relatively short pot life before hardening. Further, at the end of the application, any mixed material remaining in the tank was wasted. The present invention provides for the two components to be heated separately and then mixed thereby requiring that only the epoxy material that is needed be mixed.

Another important feature of the present invention is that the heating of the resin 36 takes place in two steps. In the first heating step, the resin 36 in the resin tank 34 is initially heated to a temperature that allows the resin 36 to reach a lowered viscosity and thereby flow, but is well below the evaporation temperature of the various components within the resin 36. This prevents various chemical components within the base resin 36 from flashing off, thereby changing the chemical composition and characteristics of the resin 36. In a second heating step, as the resin 36 is being pumped out of the resin tank 34 it enters the resin heat transfer conduit 44 wherein the walls of the piping serve to contain the resin 36 in a closed environment while heating the resin 36 to the desired application temperature of between approximately 150° F. and 160° F. In this manner, even if evaporation does occur, it is fully contained and all of the resin 36 components are transferred intact to the mixing pump 18. Similarly, if the catalyst were heated to the target temperature range of between approximately 150° F. and 160° F. using the same method in an open container, some of the components, such as ammonia, that are in the catalyst would evaporate creating problems in the finished product. Since the catalyst cannot be heated in an open chamber a catalyst heat transfer conduit 42 is provided that resides within the heating jacket 30. The catalyst is passed through the catalyst heat transfer conduit 42 before mixing, to also preheat the catalyst to the desired temperature range.

In order to increase the efficiency of the system 10 of the present invention and maximize operational up time, a resin pre-heating coil 58 may also be provided to facilitate the refilling of the resin tank 34 while the system 10 is in operation. The resin preheat coil 58 extends from the exterior of the tank 12 into the resin chamber 34 allows the resin 36 to be preheated before it is deposited into the resin chamber 34. This allows the resin chamber 34 to be periodically refilled without having to stop the application of the material while waiting for the newly added resin 36 in the resin chamber 34 to preheat.

Figure 3:
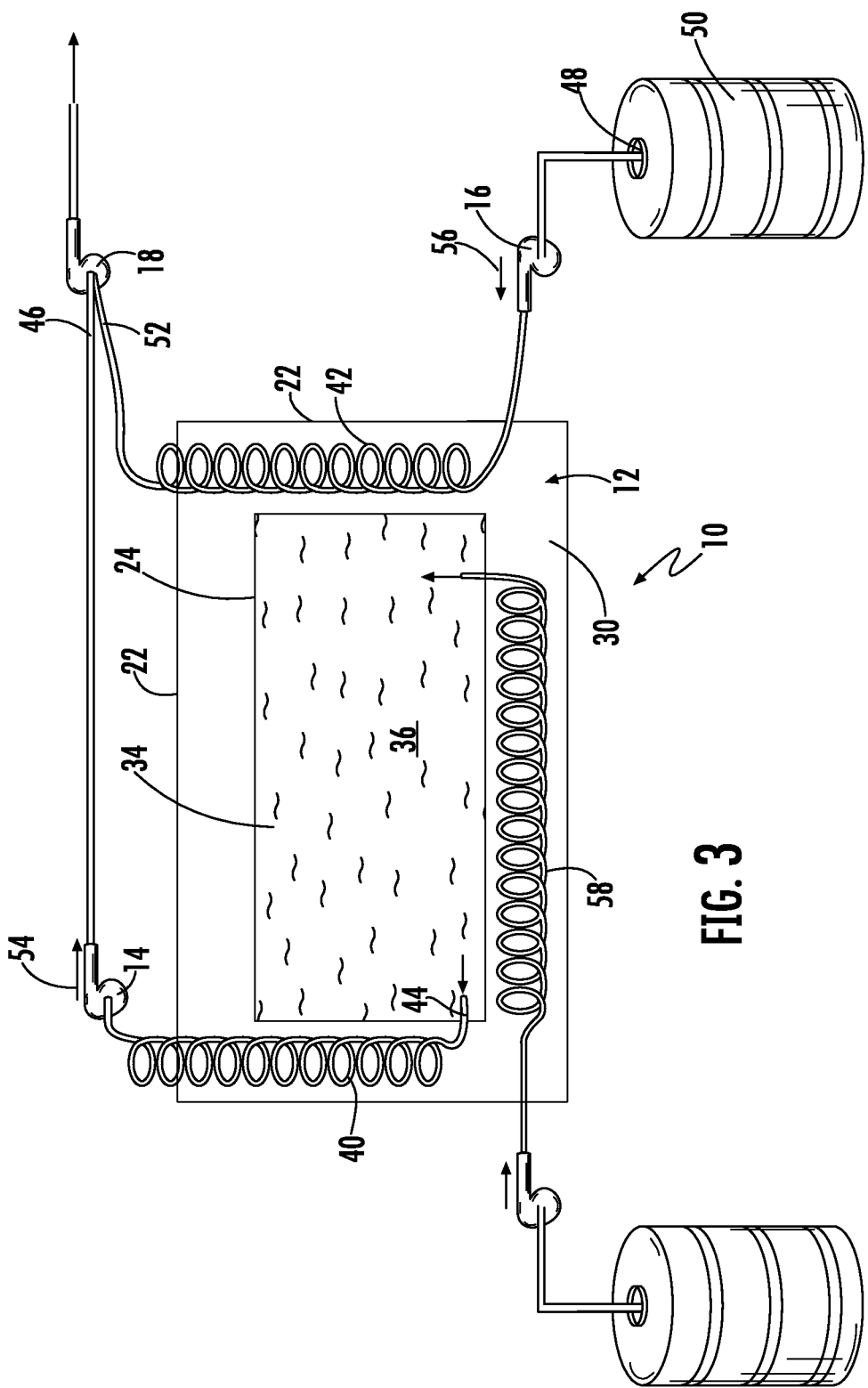
FIG. 3 is a schematic view of the method and system of the present invention.

Turning now to FIG. 3, a schematic diagram is provided best illustrates the operational method of the present invention. In general terms, the present invention provides a method of spray application for a multi-part epoxy material. Initially, the steps related to the handling of the base resin 36 including the steps of: providing a heating tank 12 with a resin chamber 34 therein; filling the resin chamber 34 with an epoxy resin 36; preheating the resin 36 within the resin chamber 34 to a first temperature; and drawing said preheated resin 36 from said resin chamber 34 to create a resin flow 54. The steps related to the handling of the catalyst include: providing a catalyst; creating a catalyst flow 56; and preheating said catalyst flow 56 to a second temperature. Once the resin 54 and catalyst 56 flows have been preheated, the catalyst flow 56 and said resin flow 54 are mixed and discharged at an elevated pressure to a spray nozzle 20 for spray application.

Optionally, the method of the present invention may provide for heating the resin 36 material in two steps. As was stated above, in the first step, the resin 36 in the resin tank 34 is initially heated to a temperature that allows the resin 36 to flow, but is well below the evaporation temperature of the various components within the resin 36. This prevents various chemical components within the base resin 36 from flashing off, thereby changing the chemical composition and characteristics of the resin 36. In a second heating step, as the resin 36 is being pumped out of the storage tank 34 it enters the resin heat transfer conduit 40 wherein the walls of the piping serve to contain the resin 36 in a closed environment while heating the resin 36 to the desired application temperature of between approximately 150° F. and 160°.

Clearly, the disclosure of the present invention provides that the heating tank 12 structure disclosed above with regard to the system 10 is the same device that is employed in the method of the present invention for the purpose of heating the resin 36 and catalyst for each of the various heating steps.

It can therefore be seen that the present invention provides a novel method and system for the spray application of epoxy materials that results in a substantial reduction in the viscosity of the material without requiring the addition of VOC solvents. Further, the present invention provides a system for the spray application of epoxy materials that has dramatically increased efficiency with respect to the manner in which materials are handled as well as increased operational up time as compared to the methods and systems known in the prior art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for the cleaning of a multi-part epoxy material from a spray applicator, said multi-part epoxy material including at least a resin and a catalyst, said system comprising:
   a heating jacket, wherein said heating jacket contains water;
   means for heating said water disposed within said heating jacket;
   a spray application system including heating components within the heating jacket in which the resin and catalyst are heated and a system for mixing and discharging said resin and catalyst;
   wherein said water within said heating jacket is mixed with a detergent and directed through said spray application to flush said spray application system.

2. The system of claim 1, wherein said detergent is a biodegradable degreaser.

3. The system of claim 1, wherein said spray application system further comprises:
   a heating tank, said heating tank including an outer wall and an inner wall, said inner wall having an inner surface and an outer surface, said outer wall and said outer surface of said inner wall cooperating to form a heating jacket therebetween, said inner surface of said inner wall forming a resin chamber, wherein said heating jacket contains a heat transfer medium, wherein said resin is contained within said resin chamber;
   means for heating said heat transfer medium disposed within said heating jacket;
   a resin heat transfer conduit disposed within said heating jacket, said resin heat transfer conduit having an input end in fluid communication with said resin chamber and an output end disposed on the exterior of said heating tank;
   a catalyst heat transfer conduit disposed within said heating jacket said catalyst heat transfer conduit having an input end in fluid communication with a catalyst reservoir and an output end disposed on the exterior of said heating tank;
   means for establishing a flow of resin through said resin heat transfer conduit;
   means for establishing a flow of catalyst through said catalyst heat transfer conduit;
   a mixing pump configured to receive and mix said flow of resin and said flow of catalyst and discharge said mixture at an elevated pressure; and
   a spray applicator for applying said discharged mixture, wherein said heat transfer medium is said heated water.

4. The system of claim 3, wherein said water further includes a biodegradable degreaser mixed therein.

5. A method for the cleaning of a multi-part epoxy material from a spray applicator, said multi-part epoxy material including at least a resin and a catalyst, said system comprising:

provide a heating jacket, wherein said heating jacket contains water;

heating said water disposed within said heating jacket;

mixing said water within said heating jacket with a detergent; and directing said mixture through a spray application system including heating components within the heating jacket in which the resin and catalyst are heated and a system for mixing and discharging said resin and catalyst, wherein said mixture flushes said spray application system.

6. The method of claim 5, wherein said detergent is a biodegradable degreaser.

7. The method of claim 5, wherein said spray application system further comprises:

a heating tank, said heating tank including an outer wall and an inner wall, said inner wall having an inner surface and an outer surface, said outer wall and said outer surface of said inner wall cooperating to form a heating jacket therebetween, said inner surface of said inner wall forming a resin chamber, wherein said heating jacket contains a heat transfer medium, wherein said resin is contained within said resin chamber;

means for heating said heat transfer medium disposed within said heating jacket;

a resin heat transfer conduit disposed within said heating jacket, said resin heat transfer conduit having an input end in fluid communication with said resin chamber and an output end disposed on the exterior of said heating tank;

a catalyst heat transfer conduit disposed within said heating jacket said catalyst heat transfer conduit having an input end in fluid communication with a catalyst reservoir and an output end disposed on the exterior of said heating tank;

means for establishing a flow of resin through said resin heat transfer conduit;

means for establishing a flow of catalyst through said catalyst heat transfer conduit;

a mixing pump configured to receive and mix said flow of resin and said flow of catalyst and discharge said mixture at an elevated pressure; and a spray applicator for applying said discharged mixture, wherein said heat transfer medium is said heated water.

8. The method of claim 7, wherein said heat transfer medium is a mixture of water and detergent.

\* \* \* \* \*